US012629959B2

(12) United States Patent
Markovic et al.

(10) Patent No.: US 12,629,959 B2
(45) Date of Patent: May 19, 2026

(54) FLAT EMBOSSING PRINTING MACHINE WITH A FOIL WEB GUIDANCE AND TRANSPORT DEVICE

(71) Applicant: GIETZ AG, Gossau (CH)

(72) Inventors: Bozidar Markovic, Gossau (CH); Beat Kägi, Bichwil (CH); Urs Brühwiler, Wilen bei Wil (CH)

(73) Assignee: GIETZ AG, Gossau (CH)

( * ) Notice: Subject to any disclaimer, the term of this patent is extended or adjusted under 35 U.S.C. 154(b) by 0 days.

(21) Appl. No.: 18/834,717

(22) PCT Filed: Feb. 2, 2023

(86) PCT No.: PCT/EP2023/052514
§ 371 (c)(1),
(2) Date: Jul. 31, 2024

(87) PCT Pub. No.: WO2023/148250
PCT Pub. Date: Aug. 10, 2023

(65) Prior Publication Data

US 2025/0108657 A1 Apr. 3, 2025

(30) Foreign Application Priority Data

Feb. 2, 2022 (CH) ........................................ 97/2022

(51) Int. Cl.
*B41F 19/02* (2006.01)
*B44B 5/00* (2006.01)
(Continued)

(52) U.S. Cl.
CPC ............ *B44B 5/022* (2013.01); *B44B 5/0052* (2013.01); *B65H 18/103* (2013.01); *B42D 25/425* (2014.10)

(58) Field of Classification Search
None
See application file for complete search history.

(56) References Cited

U.S. PATENT DOCUMENTS 5,979,308 A * 11/1999 Kagi .................... B41F 19/068 101/27
9,511,620 B2 * 12/2016 Triepel ................ B41F 16/0093
(Continued)

FOREIGN PATENT DOCUMENTS

DE 201 09 539 U1 8/2001
DE 10 2012 110 222 A1 4/2014
(Continued)

OTHER PUBLICATIONS

International Search Report dated Jun. 26, 2023, Application No. PCT/EP2023/052514; 7 pages.

*Primary Examiner* — Leslie J Evanisko
(74) *Attorney, Agent, or Firm* — Rankin, Hill & Clark LLP

(57) ABSTRACT

A flat embossed printing machine for embossing a flat material includes a flatbed press having a tool plate and an embossing table, a foil web guidance and transport device for guiding at least one embossing foil web over the embossing table of the flatbed press along a foil transport path, a flat material guidance for guiding a flat material through the flatbed press along a flat material transport path, and a control device for operating the flat embossed printing machine. The foil web guidance and transport device subsequently to the flatbed press considered in the transport direction of the flat material includes a peel-away element, arranged above the flat material transport path as well as behind the foil transport path, for holding back and peeling the embossing foil web away from the flat material on transporting the flat material away out of the flatbed press.

21 Claims, 3 Drawing Sheets

(51) Int. Cl.

| | |
|---|---|
| ***B44B 5/02*** | (2006.01) |
| ***B65H 18/10*** | (2006.01) |
| *B42D 25/425* | (2014.01) |

(56) References Cited

U.S. PATENT DOCUMENTS

| | | | | |
|---|---|---|---|---|
| 2001/0026720 | A1* | 10/2001 | Paulson .................. | B32B 38/10<br>400/120.01 |
| 2014/0053971 | A1 | 2/2014 | Oliveira et al. | |
| 2017/0210118 | A1* | 7/2017 | Schadl .................. | B41F 16/006 |

FOREIGN PATENT DOCUMENTS

| | | | |
|---|---|---|---|
| EP | 0 858 888 | A2 | 8/1998 |
| EP | 1 593 503 | A2 | 11/2005 |
| EP | 3 227 117 | B1 | 9/2018 |
| WO | 2009/143644 | A1 | 12/2009 |

* cited by examiner

Fig. 2
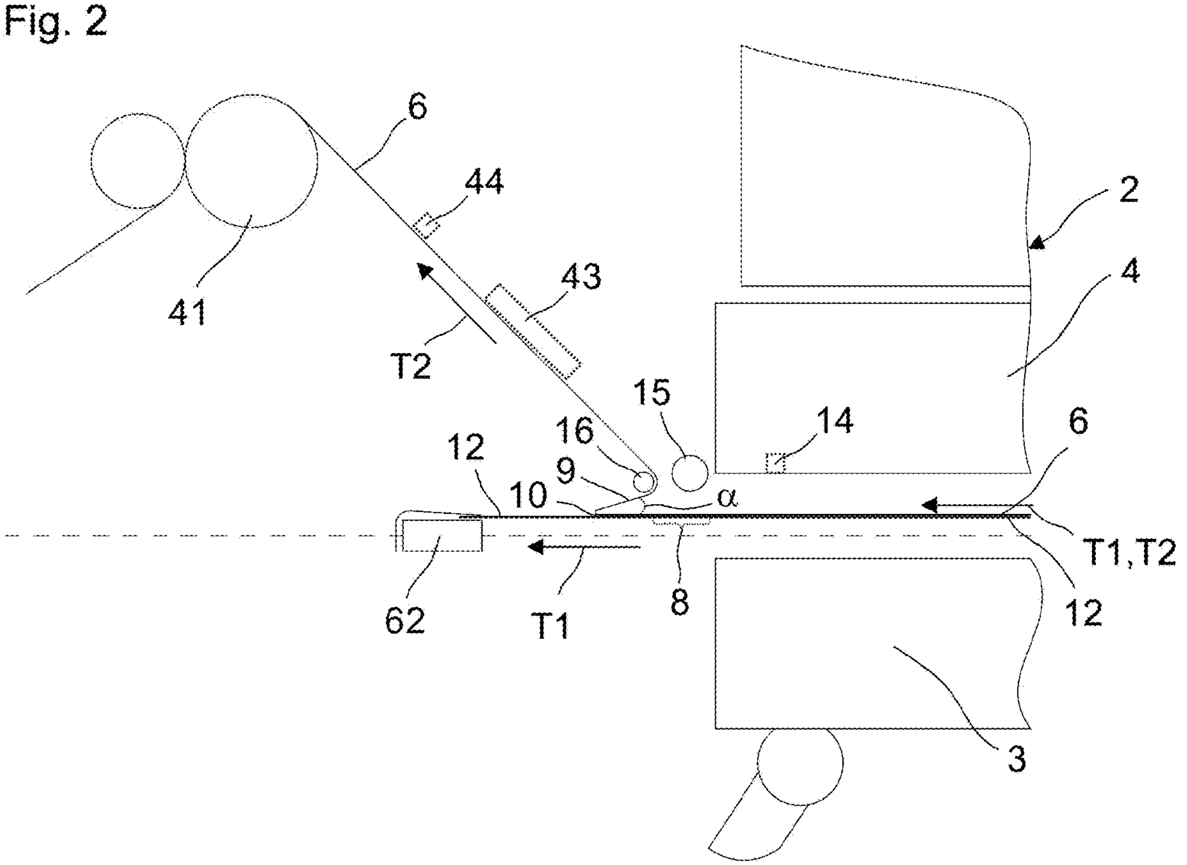
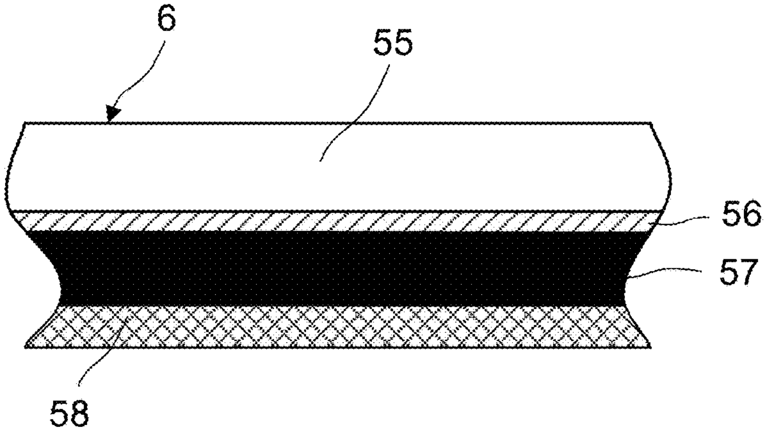
Fig. 3
Fig. 4
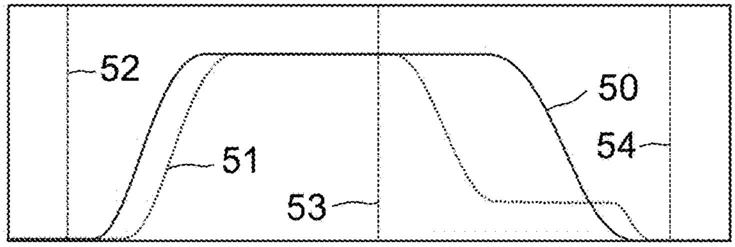

FLAT EMBOSSING PRINTING MACHINE WITH A FOIL WEB GUIDANCE AND TRANSPORT DEVICE

BACKGROUND OF THE INVENTION

Field of the Invention

The invention lies in the technical field of flat embossed printing machines and relates to a flat embossed printing machine for embossing a flat material, with a foil web guidance and transport device for at least one embossing foil web which is led over the embossing table of a flatbed press.

Description of Related Art

Particularly high embossing outputs with the best of quality also for demanding embossing tasks can be carried out with such types of flat embossed printing machines which are also called flatbed embossed printing machines.

For this reason, flat embossed printing machines place particularly high demands on the guidance and the precise advance of the foil, on the one hand of thin, narrow and very sensitive embossing foil webs, in particular of hologram foil webs, and on the other hand on the precise guidance and positioning of the flat material.

If the flat embossed printing machines include a foil web guidance and transport device for several embossing foil webs, then even several embossing foil webs, under certain circumstances of a different type (with different web widths, advance lengths and with different detachment forces after the embossing), need to be simultaneously guided and transported in a perfectly smooth manner.

The guidance of the foil must be effected in a perfectly planarly smooth and correctly positioned, in particular a register-accurate manner, without deformation, arching, creases and dislocations. The rapid, intermittent foil advance of the embossing foil web needs to be carried out in an optimally gentle manner, in order to be able to achieve high outputs as well as a high quality.

Such flat embossed printing machines with foil web guidance and transport devices are known e.g. from EP 1 593 503, WO 2009/143644, EP 0 858 888 and EP 3 227 117.

For demanding picture embossing tasks, in particular for hologram embossing with picture security features, e.g. for vouchers, identity documents or banknotes, with one or more embossing foil webs over the complete embossing table, not only must an optimal, error-free positioning of foil webs and flat material be achieved, but above all also a gentle and perfect separation of the carrier foil webs from the flat material given the continued transport after the embossing.

An embossing foil web typically has layer thicknesses of only 12 to 20 μm (0.012 to 0.02 mm). It includes a carrier foil or carrier foil web which as a rule consists of plastic, such as e.g. polyester. The carrier foil web serves as a basis and transport medium for the other layers or the picture elements, also called embossing pictures. The picture elements or embossing pictures which are to be transferred upon the flat material are deposited on the carrier foil web via a separating layer. The picture elements are characterised by their optically effective characteristics. The picture elements can include metal and/or colour layers or consist of such. The picture elements can be, for example, in the form of security strips or patch strips for securities such as banknotes. Accordingly, the embossing foil webs can be present as foil strips. Typical widths of security strips are e.g. 8-12 mm. Typical widths of patch strips are e.g. 15-22 mm. The picture elements in particular can be holograms.

The separating layer is a binding and release layer, in particular of a minimal thickness and as a rule consists of wax-like substances. On the one hand it is to keep the picture elements on the carrier foil web and on the other hand this layer is to permit the undamaged release of the picture elements from the carrier foil web subsequently to the embossing procedure. As a rule, this is effected by way of the separating layer being melted or softened under the action of pressure and/or heat during the embossing procedure.

The carrier foil web and thus also the picture elements are provided on the embossing side with an activatable adhesive layer. The activatable adhesive layer consists for example of a hot adhesive or of a radiation-cured plastic which is deposited in an extensive manner. This layer is activated due to the heat effect of the embossing tool (embossing stamp) or due to the subsequent radiation and connects the picture elements which are to be transferred, to the flat material. The picture elements which are transferred onto the flat material assume a permanent adhesive connection with the flat material via the activated adhesive layer.

Radiation-cured adhesive layers as a rule have a two-stage adhesive capacity. Hence, such adhesive layers develop a primary adhesion during the embossing procedure due to the effect of heat. In a second step, the adhesive layer subsequently to the embossing procedure is activated downstream outside the flatbed press by way of a suitable irradiation (e.g. UV-radiation) and a permanent, secondary adhesion arises due to the chemical reaction.

Subsequently to the embossing procedure, the carrier foil web can be released from the embossed picture elements more or less easily depending on the design of the separating layer. It is particularly with embossing foil webs with radiation-cured, in particular UV-cured adhesive layers that a poor release behaviour arises.

Hence UV-cured adhesive layers of embossing foil webs which are rolled up on unwind rolls tend to adhere to the rear side of the carrier foil which is away from the embossing side, the carrier foil being adjacent on the unwind roll. This results in the adhesive characteristics of the separating layer between the carrier foil and the picture elements having to be reinforced, so that on unwinding the embossing foil web from the unwind roll the picture elements do not detach from the carrier foil and remain adhering to the rear side of the adjacent carrier foil via the adhesive layer.

The release of the carrier foil web from the flat material in the case of flat embossed printing machines is usually effected by way of push separation by way of the flat material being transported away out of the flatbed press along a linear transport path, for example by way of a beam gripper, whilst the embossing foil web subsequently to the flat bed press and in the course of a foil advance is led obliquely upwards at an angle away from the flat material.

Vacuum means can be provided at the embossing table, so that given the push separation the flat material or the sheets are not lifted upwards by the still adhering embossing foil web, said vacuum means holding the sheets on the embossing table by way of a vacuum and only permitting a planar movement of the flat material away from the embossing table.

Given poor release behaviour of the embossing foil web subsequently to the embossing procedure, this web however remains adhering to the flat material for longer than envisaged or is desired. By way of this, on the one hand the carrier foil web is deformed, overstretched and damaged. On the other hand the sheet also becomes deformed, uneven and distorted by way of this not being transported away in a planar manner in the envisaged transport direction, but being deflected upwards by the adhering carrier foil web. It is even possible for creases to form in the sheet. By way of this, faulty and unusable embossing products arise with the subsequent cutting to size of the flat material.

SUMMARY OF THE INVENTION

It is therefore the object of the present invention to put forward a modified embossing foil web guidance and transport device for flat embossed printing machines, said device permitting an improved and reliable separation of the embossing foil web and the flat material after the embossing even given separating layers having a greater adhesive effect, and herewith an error-free guidance of the embossing foil web and flat material after the embossing, so that the flat material is not inadvertently deflected and deformed by the embossing foil web and the at least one foil web does not become overstretched and damaged.

The flat embossed printing machine for embossing a flat material includes:

- a flatbed press, including an embossing table and tool plate,
- a foil web guidance and transport device for guiding at least one embossing foil web over the embossing table of the flatbed press along a foil transport path,
- a flat material guidance for guiding a flat material through the flatbed press along a flat material transport path, as well as
- a control device for operating the flat embossed printing machine.

According to the invention, the foil web guidance and transport device subsequently to the flatbed press considered in the transport direction of the flat material includes a peel-away element which is arranged above the flat material transport path as well as behind the foil transport path, for holding back and peeling the embossing foil web away from the flat material on transporting the flat material away out of the flatbed press.

In particular, the embossing foil web is led through the flatbed press above the flat material. Accordingly, the peel-away element is arranged above the flat material transport path.

The flat material transport path describes the transport path which the flat material covers in the flat embossed printing machine. Accordingly, the foil transport path describes the transport path which the embossing foil web covers in the flat embossed printing machine.

The foil web guidance and transport device of the flat embossed printing machine in particular includes a foil feed device which is yet specified in more detail further below, for feeding the at least one embossing foil web to the flat bed press, as well as a foil lead-away device which is likewise yet specified in more detail further below, for leading the at least one embossing foil web away from the flatbed press. The foil web guidance and transport device in particular includes a foil advance device, such as an advance roller or advance roller pair, for carrying out an advance of the foil on the flatbed press. In particular, the foil advance device is arranged in the foil lead-away device.

An embossing foil web is to be understood as a foil or a film which is led through the flatbed press, with at least one picture element or embossing picture which is to be embossed. In particular, the embossing foil web is led through the flatbed press in a continuous manner, e.g. from roll to roll.

The at least one picture element or embossing picture can be a uniform or equally shaped layer, such as e.g. a metal layer or dye layer. The at least one picture element or embossing picture can completely or only regionally cover the carrier foil.

The at least one picture element or embossing picture can also include a pattern or a structure. These can be formed e.g. by way of a different colouring, materials or layer thicknesses. The at least one picture element or embossing picture in particular is characterised by an optical effect which arises from this. In particular, the at least one picture element or embossing picture can be a hologram. In particular, the at least one picture element or embossing picture can be a security feature e.g. for securities such as banknotes.

The embossing foil web in particular includes several picture elements or embossing pictures. Such an embossing foil web is also called picture foil web. The picture elements or embossing pictures can completely cover the carrier foil. In this case, the picture elements or embossing pictures are adjacent to one another. The picture elements or embossing pictures can also only regionally cover the carrier foil. In this case, the embossing foil also forms regions which are not covered by picture elements or embossing pictures. Here, e.g., the picture elements or embossing pictures can be arranged on the carrier foil in a manner distanced from one another.

As a rule, the embossing foil web is present as a roll product and is transported in a guided manner from an unwind roll as part of the foil feed device, through the flatbed press to a winding roll as part of the foil lead-away device of the flat embossed printing machine.

For the sake of simplicity, in the present disclosure the term embossing foil web is consistently used for the foil web before the embossing of the picture elements as well as for the foil web after the embossing of the picture elements. This also takes into account the fact that not necessarily are all pictures of the embossing foil web embossed given the embossing passage.

The flat embossed printing machine can be designed to simultaneously emboss one or more embossing foil webs which in particular are led over the embossing table in parallel next to one another, on the flat material. In the course of the description of the invention, one embossing foil web is referred to in each case for the sake of simplicity. This however does not rule out the simultaneous processing of several embossing foil webs on a flat material. Accordingly, device features and method features according to the invention can also be applied to further embossing foil webs in the same flat embossed printing machine.

In particular, the flat material is a paper or cardboard. The flat material can be present as sheets which are individually transported into the flatbed press, embossed with picture elements and transported away again out of the flatbed press. The transport of the sheets can be effected via grippers, such as gripper beams which grip the sheets at their leading edge and pull them through the flatbed press along the sheet transport path in the transport direction.

The sheets can be pulled off from a sheet stack individually in a sheet feeder. After the embossing procedure, the embossed sheets can be deposited on a sheet stack of a sheet delivery.

However, it is also conceivable for the flat material to be present as a web which is continuously led through the flatbed press. In this case, the flat material can be present as a roll product and be transported through the flatbed press from an unwind roll to a winding roll.

The flatbed press is characterised by the design of a flat or plane embossing region. Since the tool plate as well as the embossing table is designed in a flat manner in the flatbed press, one also speaks of a flat-flat press.

The flat material transport path runs in a path section which connects directly to the flatbed press and extends up to the peel-away element, in particular in a linear and very particularly horizontal manner.

The flat material transport path runs below the peel-away element in particular in a linear and very particularly horizontal manner.

The foil transport path subsequently to the flatbed press in the transport direction in particular has a path component which leads perpendicularly away from the flat material transport path, in particular leads away upwards. This means that the transport paths of the flat material and the embossing foil web which run parallel next to one another in the flatbed press run in a diverging manner at the exit of the flatbed press. The foil transport path in particular runs obliquely upwards subsequently to the flatbed press in the transport direction.

The peel-away element now is arranged relative to and in particular at a distance to the flat material transport path in a manner such that the embossing foil web which adheres to the embossed flat material which is transported away out of the flatbed press and past the peel-away element below the peel-away element is held back by the peel-away element and thus peeled away.

According to a particular further development of the invention, the peel-away element is arranged relative to and in particular at a distance to the flat material transport path or to the flat material, in a manner such that the embossing foil web which adheres to the embossed flat material is peeled away from the flat material amid the formation of an open foil loop, hereinafter called peel-away loop, which coming from from the peel-away element extends downstream in the transport direction of the flat material.

In this case, the peel-away element also serves for the formation of an open peel-away loop. On account of the formation of a peel-away loop, an acute peel-away angle which acts positively on the peeling-away procedure results between the embossing foil web which considered in the transport direction is peeled away behind the peel-away point, and the embossing foil web which adheres to the flat material in front of the peel-away point, The acute peel-away angle is for example smaller than 90° (angle degrees), in particular smaller than 75°, particularly smaller than 60° and very particularly smaller than 45°. The acute peel-away angle is moreover for example larger than 0°, in particular larger than 5°, particularly larger than 10° and very particularly larger than 15°.

According to a further development of the flat embossed printing machine, the foil web guidance and transport device includes a deflecting element which considered in the transport direction of the flat material is arranged above the flat material transport path at the exit of the flatbed press and in front of the peel-away element, for deflecting the embossing foil web out of the transport direction of the flat material. The embossing foil web is hereby led between the deflecting element and the peel-away element.

The peel-away element is accordingly arranged subsequently to the deflecting element in the transport direction of the flat material.

The deflecting element is consequently arranged at the same side of the flat material as the peel-away element. The deflecting element in particular is arranged above the flat material.

The deflecting element forms an in particular arcuate deflecting surface for deflecting the embossing foil web out of the transport direction of the flat material. The deflecting element can be a longitudinal component, such as a rod, which runs perpendicularly to the transport direction of the embossing foil web. In particular, the deflecting surface of the deflecting element is stationary, so that the peeled-away embossing foil web is led over the deflecting surface.

In particular, the deflecting element is arranged at a distance to the flat material transport path or to the flat material.

According to a further development of the invention, the peel-way element is arranged at a distance to the flat material transport path or to the flat material.

The distance of the deflecting element to the flat material transport path or to the flat material in particular is larger than the distance of the peel-away element to the flat material transport path or to the flat material.

The peel-away element can be arranged, e.g., at a distance of 1 mm or larger, in particular 2 mm or larger and very particularly of 3 mm or larger, to the flat material transport path or to the flat material.

The peel-away element can moreover be arranged, e.g., at a distance of 30 mm or less, in particular of 20 mm or less and very particularly of 10 mm or less to the flat material transport path or to the flat material.

In particular, the peel-away element forms an arcuate deflecting surface for the deflection of the embossing foil web out of the transport direction of the flat material.

The peel-away element can be a longitudinal component such as a rod, which runs transversely to the transport direction of the embossing foil web. The deflecting surface of the peel-away element can be stationary, so that the peeled-away embossing foil web is led over the deflecting surface.

The peel-away element can also be a rotatable roller. Accordingly, the lateral surface of the roller forms a rotatable deflecting surface for the peeled-away embossing foil web. The roller can be actively driven or freely rotatable.

According to a further development of the invention, the flat embossed printing machine or the foil feed device includes an unwinding device for unwinding the embossing foil web from an unwind roll.

According to a further development of the invention, the flat embossed printing machine or the foil feed device includes a foil store which is arranged in front of the flatbed press, in particular between the unwind device and the flatbed press, for the temporary intermediate storing of a foil web length of the embossing foil web between two embossing procedures.

The foil store in particular includes a store formation device for filling a receiving space of the foil store with embossing foil web lengths.

In particular, the foil store is designed to intermediately store a foil web excess length in the foil store, the foil web excess length being advanced or fed through the flatbed press beyond the predefined advance length and being pulled back again counter to the advance direction by the foil feed device, wherein this is the case without the respective foil web excess length having to be wound up on the unwind roll again.

Furthermore, in particular the foil store is designed to intermediately store a foil web length for a subsequent foil advance.

Flat embossed printing machines have very short press cycles and therefore high cycle rates which can amount for example to 50 embossing runs per minute. This demands high foil advance speeds. Accordingly, the advance length of the embossing foil web must be provided within a short time. Since the unwinding of the embossing foil web from an unwind roll is a comparatively sluggish procedure, advantageously a foil store with a short reaction time with regard to the release of an intermediately stored embossing foil web length is provided between the unwind roll and the flatbed press. The intermediately arranged foil store permits a slower and in particular continuous unwinding of the embossing foil web from the unwind roll, the unwinding not being coupled directly to the foil advance. The wound-off embossing foil web is intermediately stored in the foil store until its retrieval.

Accordingly, the advance length of the embossing foil web for the foil advance is obtained from the foil store.

In particular, the foil store is a foil loop store in which a foil web length in the form of at least one open foil loop is intermediately stored in a loop receiver.

The store formation device in particular is a differential pressure device for pulling an embossing foiled web length into the foil store, in particular for shaping an open foil loop, by way of an air pressure difference which is exerted upon the foil web. The air pressure difference can be generated e.g. by way of subjecting the embossing foil web to an airflow, e.g. by way of a pressurised air device. The air pressure difference can also be generated by way of applying a vacuum to the foil web, e.g. by way of a vacuum device. A combination of the two aforementioned methods is also possible.

If the air pressure difference is generated by way of applying a vacuum, then the loop receiver can be a suction channel in which a suction draft is applied, by way of which the embossing foil web which is led past the channel opening is drawn in. Such a foil loop store is described for example in EP 0 858 888 A2.

The invention further also relates to a method for operating the flat embossed printing machine according to the invention which is described further above and in particular for peeling the embossing foil web away from an embossed flat material subsequently to the embossing procedure.

For carrying out an embossing procedure, the embossing foil web by way of the foil advance as well as the flat material is transported over the embossing table into the open flat bed press and is positioned. The embossing foil web and the flat material are subsequently led together by way of closing the flatbed press, wherein the tool plate with the heated embossing tools is pressed against the embossing table and the embossing procedure in which picture elements are transferred from the embossing foil web onto the flat material is carried out by way of the action of pressure and heat.

After completion of the embossing procedure, the flatbed press is opened and the embossed flat material together with the embossed-out embossing foil web section is transported away out of the flatbed press, wherein simultaneously an advance length of the picture path foil is fed by way of a foil advance. The embossing foil web section which is transported away out of the flatbed press together with the flat material is detached from the flat material at the exit of the flatbed press and is transported further in a separate manner.

The advance length of the foil advance corresponds to the embossing section in the flatbed press including any occurring dummy section, on which for example print marks for the register-accurate positioning of the embossing foil web can be arranged in the flatbed press. A typical advance length can be for example 700 mm.

The control device as a rule is designed such that the foil advance device carries out a foil advance with a defined advance length with each embossing cycle. The foil advance in particular is moved according to a predefined speed profile which is stored in the control device. The foil feed device herein provides the advance length which is required given the advance of the foil, e.g. in an intermediate foil store.

On account of the predefined foil advance, on the one hand it is ensured that an adequate embossing foil web section with picture elements is fed into the flatbed press. On the other hand, for the purpose of avoiding an unnecessary consumption of the foil, it is also ensured that an excess dimension or an excess length of foil web whose picture elements cannot be embossed is not fed.

The release of the embossed-out embossing foil web section from the flat material at the exit of the flatbed press is effected by way of the embossing foil web being led into a deflection.

The method according to the invention is now characterised in that subsequently to the embossing procedure, the flat material is transported away out of the opened flatbed press along the flat material transport path and past the peel-away element, wherein the embossing foil web which is carried along meets the peel-away element and activates a peeling of the embossing foil web away from the flat material.

The flat material in particular is transported below the peel-away element past this.

The peel-away element in particular serves for holding back the embossing foil web which adheres to the flat material. This means that the peel-away element holds back the embossing foil web which adheres to the flat material from a further transport in the transport direction of the flat material.

According to a further development of the method, the embossing foil web which adheres to the flat material is peeled away from the flat material amid the formation of an open peel-away loop which coming from the peel-away element extends or forms downstream in the transport direction of the flat material.

Hereby, the one limb of the peel-away loop is formed by an embossing foil web section which adheres to the flat material.

The peel-away loop can hereby reach a loop length of up to 50 mm in particular up to 100 mm.

The formation of the peel-away loop or the loop length of the peel-away loop in particular is controlled by the speed course or the speed profile of the foil advance.

Thus, after completion of the embossing procedure and after opening the flatbed press, the foil advance in particular is delayed with respect to the flat material transport out of the flatbed press. This means that the foil advance does not begin until the embossed flat material has already been pulled out of the flatbed press by a certain amount.

This permits the advancing of the embossed flat material together with the embossing foil web which adheres to this, towards the peel-away element or beyond this, without the leading, free embossing foil being immediately (post-) pulled by the foil advance. Specifically, the latter would inhibit or prevent the formation of a peel-away loop.

The larger the delay of the foil advance, the larger the peel-away loop is formed.

During the peeling-away procedure, the loop length can in turn be influenced or controlled by the speed course or the speed profile of the foil advance. An increase of the speed of the foil advance relative to the sheet transport effects a reduction in the size of the peel-away loop. A reduction of the speed of the foil advance relative to the sheet transport effects an enlargement of the peel-away loop.

Since the speed profile of the sheet transport as a rule cannot be changed, the relative speed increase or decrease in particular is effected by a change in the foil advance speed.

According to a particular embodiment of the method, the foil advance and the sheet transport have the same speed during the peeling-away procedure. Accordingly, the loop size or length remains constant during the peeling-away procedure.

However, for the purpose of reducing or even eliminating the peel-away loop, an increase of the foil advance speed relative to the sheet transport can be envisaged towards the end of the peeling-away procedure. The embossing foil web excess length is also reduced in size due to the size reduction or even elimination of the peel-away loop towards the end of the peeling-away procedure.

For process-related reasons, it is indeed desirable for the pulled-back embossing foil web excess length to be as short as possible. On the one hand, this is to fill the foil store with as little as possible embossing foil web excess length. On the other hand, the embossing cycle where possible is not to be lengthened by an extended pulling-back of embossing foil web excess lengths. Moreover, the less embossing picture foil excess length needs to be pulled back, the more rapid and precise is a register-accurate positioning of the embossing picture foil way of reading out print marks.

For this reason, in a further development of the method, one envisages the speed of the foil advance being increased relative to the speed of the flat material transport towards the end of the peeling-away procedure, in a manner such that the peel-away loop is reduced and in particular is eliminated at the end of the peeling-away procedure.

The loop length or the loop shape can furthermore vary during the peeling-away procedure also on account of a changing peeling-away force at the point of peeling-away or at the line of peeling-away.

This means that the release or peeling-away procedure of the embossing foil web from the flat material is not necessarily uniform. Thus, the peeling-away force can vary within a release procedure. This is the case, e.g., if the carrier foil is not continuously provided with picture elements in the transport direction. This means that the embossing foil web does not adhere to the flat material in the regions between two successive picture elements or embossing pictures or only to a limited extent. On account of the absent or lower peeling-away force between the picture elements or embossing pictures, the peeling-away point in these surface regions springs back counter to the transport direction, which leads to a reduction in tension in the already peeled-away embossing foil web after the point of peeling-away. The reduction in tension in turn can lead to an enlarged peeling-away angle and to a reduction of the loop length as well as to a deformation and therefore shape change of the peel-away loop on account of the rapidly reducing foil tension.

If the embossing foil web is continuously provided with picture elements or embossing pictures in the transport direction, then one can assume a uniform peeling-away force. The loop tension accordingly remains constant. The loop length during the peeling-away procedure is merely influenced by the aforementioned speed difference between the foil advance and the transport speed of the flat material.

On processing embossing foil webs whose carrier foil webs can be separated from the flat material in a comparatively easy manner subsequently to the embossing procedure, the release procedure as a rule takes place below the deflecting element of the foil web guidance and transport device directly at the exit of the flatbed press. The embossing foil web is accordingly released from the flat material by way of push-separation.

With regard to embossing foil webs which have a worse release behaviour, the flat material with the adhering embossing foil web in contrast moves downstream away from the flatbed press towards the peel-away element and further downstream beyond the peel-away element amid the formation of an open peel-away loop.

The movement of the flat material with an adhering picture foil web downstream requires a feeding of the embossing foil web through the flatbed press in the advance direction, such feeding exceeding the advance length of the predefined foil advance.

The fed embossing foil web excess length corresponds roughly to the distance between the point of peeling away of the embossing foil web directly before its release from the flat material at the trailing end of the embossed flat material or at the trailing edge of the embossed sheet and the exit-side end of the embossing region of the flatbed press (any occurring dummy sections are not included in the calculation).

According to a further development of the method, an embossing foil web excess length which is advanced through the flatbed press is pulled back again counter to the foil advance direction subsequently to the peeling-away procedure. A predefined foil tension is also created again in the flatbed press by way of pulling back the embossing foil web excess length. From case to case, this way it is also ensured that the embossing foil web is positioned in register to the flat material in the flatbed press for the subsequent embossing procedure.

Since the foil guidance and transport device does not permit a pulling-back of the embossing foil web length from the foil advance device, the embossing foil web as mentioned can be simply pulled back until reaching a defined foil tension. The embossing foil web excess length does not therefore need to be known for this method step.

The pulled-back embossing foil web excess length in particular is intermediately stored in the foil store for a later embossing procedure. This means that the retracted embossing foil web excess length becomes part of an intermediately stored embossing foil web length for a later foil advance.

For providing an adequate embossing foil web length which is intermediately stored in the foil store, for a subsequent advance of the foil, in particular a further embossing foil web length is unwound from the unwind roll and together with the pulled-back embossing foil web excess length is intermediately stored in the foil store, in particular in a foil loop.

The guidance of the embossing foil web through the flatbed press is therefore effected over several embossing cycles in the fashion of a pilger process, by way of the embossing foil web being advanced over the embossing table by the advance length plus the foil web excess length subsequently to the embossing procedure and thereafter being pulled back again by the foil web excess length and subsequently to the following embossing procedure being advanced again over the embossing table by the advance length plus the foil web excess length, etc.

In particular, the embossing foil web excess length is pulled back by way of the store formation device of the foil store. The store formation device herein exerts a tensile force upon the embossing foil web counter to the advance direction, during the peeling-away procedure. The tensile force ensures the maintenance of the foil tension, but simultaneously permits the foil advance as well as the (post-) pulling of the foil web excess length. The exerted tensile force counter to the advance direction is consequently smaller than the tensile force which is exerted upon the embossing foil web during the foil advance. In particular, this also relates to the tensile force which is exerted for pulling back the embossing foil web excess length.

According to a further development of the method, the advanced embossing foil web excess length which is not (post-) pulled by the foil advance device springs back due to the tensile force as soon as the embossing foil web is completely released from the flat material. This is the case when the point of peeling away has reached the trailing end of the embossed flat material or the trailing edge of the sheet and detaches from the flat material. The springing-back of the embossing foil web in particular can be effected in the manner of a whip movement.

If the picture elements of the embossing foil webs are to be deposited upon the flat material in a positionally accurate manner or in register, then print marks which are detected by print mark sensors can be deposited on the embossing foil web. The foil advance can be carried out in a positionally accurate manner or in register to the flat material by way of the control device on the basis of the print marks which are detected by the print mark sensors.

A constant foil tension is a necessity for the registration of the embossing foil web. The registration of the embossing foil web is therefore effected in particular in an embossing foil web section, in which the foil tension can be controlled or regulated.

Hence a braking and guidance wall, on which the embossing foil web is led past and which serves as a foil tensioning device for tensioning the embossing foil web in the open flatbed press can be arranged between the foil store and the flatbed press. Such a braking and guidance wall is described in more detail further below in the context of the embodiment example according to FIG. 1. A detailed description of a braking and guidance wall can also be found in the published document EP 1 593 503 A2.

Additionally or alternatively to this, a braking and guidance wall which permits a control of the foil tension between the braking and guidance wall and the foil advance device can be arranged between the peel-away element or the deflecting rod and the foil advance device. The construction of the braking and guidance wall can be as described above.

For registering the embossing foil web, in particular a print mark sensor for detecting and reading out print marks on the embossing foil web is arranged along the foil transport path. In particular, the print mark sensor is arranged in an embossing foil web section, in which the foil tension can be controlled or regulated. This is particularly the case subsequent to a braking and guidance wall. Possible positions of print mark sensors are disclosed for example in the context of the embodiment example according to FIG. 1.

The device according to the invention and the associated method permit the reliable, malfunctioning-free and damage-free pulling of the embossing foil web away from the flat material even given separating layers with a high adhesion. The formation of a peel-away loop leads to a change of the main direction component of the peel-away force which acts upon the flat material, from perpendicular to parallel to the flat material. By way of this, the flat material is loaded to a lesser extent even given greater pulling-away forces and a deformation or other damage to the flat material does not occur.

Furthermore, the peel-away element also contributes to the flat material not being deflected transversely to the transport path in the direction of the directly peeled-away embossing foil web during the release procedure.

A further aspect of the invention relates to the control of the foil tension of the embossing foil web section which is led through the flatbed press. For avoiding the formation of creases and thus faulty embossing, it is necessary before the embossing procedure to pretension the embossing foil web section which is led through the flatbed press. The application of a predefined or specified foil tension with each embossing procedure furthermore permits a controlled or register-accurate transfer of the embossing pictures onto the flat material. Hence the embossing foil has a certain stretchability or elasticity, by which means the application of a foil tension leads to a stretching of the foil and hence also to a displacement of the embossing pictures relative to one another.

For this reason, the foil stretching on pretensioning or tensioning the embossing foil web section must also be taken into account for a register-accurate transfer of the embossing pictures onto the flat material. This means that the embossing pictures are arranged on the embossing foil in a manner such that these are transferred onto the flat material in register given a defined foil tension or stretching of the embossing foil. The foil stretching herein not only depends on the tension which is applied to the embossing foil web, but also on the stretchability and temperature sensitivity of the applied embossing foil or of its carrier foil. These variables must also be taken into account on determining the foil stretching.

Accordingly, on setting up the flat embossed printing machine, the foil tension of the embossing foil web section must be set such that the embossing pictures of the embossing foil web section which is led through the flatbed press are in register with the flat material which lies therebelow. Herein, it is important that the same foil tension is applied over all embossing cycles after setting up the flat embossed printing machine for a production lot. Only in such a manner are embossing pictures transferred onto the flat material in a register-accurate manner with each embossing cycle.

If other embossing foils with other characteristics are applied for a subsequent production lot, then the foil tension needs to be set afresh on setting up the flat embossed printing machine.

As already mentioned further above, considered in the transport direction of the embossing foil web, a braking and guidance wall with a guide surface for the embossing foil web can be arranged in front of the flatbed press as part of a foil tensioning device, on which guide surface the embossing foil web is led past and which serves for tensioning the embossing foil web in the open flatbed press. The guide surface interacts with a vacuum device, by way of which a vacuum can be generated at the guide surface. The applied vacuum ensures a bearing or sucking of the embossing foil web respectively on and onto the guide surface of the braking and guidance wall. The applied vacuum in particular also ensures a braking of the embossing foil web. The greater the applied vacuum, the greater is the braking effect upon the embossing foil web and the higher is the foil tension of the embossing foil web section which is led through the flatbed press and vice versa.

As has likewise been described above in detail, a springing-back of the embossing foil web counter to the transport direction of the embossing foil web occurs after the complete release of the embossing foil web from the embossed flat material subsequently to an embossing procedure. For creating the foil tension again, the embossing foil web must therefore be pulled back by a defined amount counter to the transport direction of the embossing foil web.

This for example is effected by a foil store which in the transport direction is arranged in front of the braking and guidance wall, as described above. A pulling-back of the embossing foil web, e.g. into the foil store however is only possible if the braking and guidance wall exerts no braking effect and consequently no vacuum or suction pull upon the embossing foil web. The braking and guidance wall consequently needs to be vented for pulling back the embossing foil web. Accordingly, the braking and guidance wall is supplied with a vacuum and vented in an alternating manner over several embossing cycles. Since the change between the vacuum supply and venting cannot be effected infinitely quickly for technical reasons, the braking and guidance wall acts in a limiting manner on shortening embossing cycles.

It is therefore an object of the present, further aspect of the invention, alternatively or supplementarily to a braking and guidance wall, to put forward a foil tensioning device for controlling the tension of the embossing foil web section which is led through the flatbed press, said device permitting a further shortening of the embossing cycles.

The flat embossed printing machine for embossing a flat material according to this aspect of the invention includes:

- flatbed press, including a tool plate and an embossing table,
- a foil web guidance and transport device for guiding at least one embossing foil web over the embossing table of the flatbed press along a foil transport path,
- a flat material guidance for guiding a flat material through the flatbed press along a flat material transport path,
- a foil tensioning device for tensioning an embossing foil web section which is led through the flatbed press, as well as
- a control device for operating the flat embossed printing machine.

The foil tensioning device now according to a second aspect of the invention includes:

- a foil clamping device for clamping the embossing foil web at a clamping location which in the transport direction of the embossing foil web is arranged in front of the flatbed press,
- a foil deflecting device for deflecting the at least one embossing foil web out of the foil transport path after the clamping location considered in the transport direction of the embossing foil web, for the purpose of controlling the foil tension.

In particular, the foil tensioning device is designed in order to temporarily deflect the embossing foil web during an embossing cycle or embossing procedure, for the purpose of controlling the foil tension.

In particular, the foil deflecting device is designed for deflecting the at least one embossing foil web out of the foil transport path between the clamping location and the flatbed press.

According to a further development, the aforementioned foil clamping device is a first foil clamping device and the clamping location a first clamping location. The foil tensioning device furthermore includes a second foil clamping device for clamping the at least one embossing foil web at a second clamping location which in the transport direction of the at least one embossing foil web is arranged after the flatbed press. The foil deflecting device is herein designed for deflecting the at least one embossing foil web out of the foil transport path between the first and the second clamping location.

The foil tensioning device in particular is part of the foil web guidance and transport device or is assigned to this. The (first) foil clamping device and the foil deflecting device in particular are part of the foil feed device or assigned to this.

The second foil clamping device, if present, in particular is part of the foil lead-away device or is assigned to this.

The (first) clamping location as well as the foil deflecting device in particular is arranged in the press run-in. The (first) clamping location as well as the foil deflecting device in particular is arranged directly in front of the flatbed press.

The second clamping location, if present, in particular is arranged in the press run-out or—if present—subsequently to the peel-away element. The second clamping location in particular is arranged directly after the flatbed press or—if present—directly after the peel-away element.

By way of the arrangement of the clamping location or clamping locations in the direct proximity of the press entry or press exit, the embossing foil section which is to be tensioned is kept as small as possible, which permits a more precise positioning of the embossing foil or its embossing pictures in the flatbed press.

The term "clamping" in particular means that the embossing foil is held by the clamping device, i.e. cannot be moved or pulled through the clamping location. The clamping can be two-dimensional or linear. The embossing foil web is clamped in particular over its entire width by way of the foil clamping device.

In particular, the foil clamping device is designed to assume a clamping position, in which the embossing foil web is clamped, and a transport position, in which the embossing foil web can be moved through the foil clamping device.

The foil clamping device according to the claims in particular is characterised in that this includes a clamping element each on both sides of the embossing foil web, between which the embossing foil web can be clamped.

At least one clamping element of the foil clamping device is designed to assume a clamping position, in which the embossing foil web is clamped, and a transport position, in which the embossing foil web can be moved past the foil clamping device in the transport direction. For this, the clamping element in particular is mounted in a movable manner.

Thus the at least one clamping element can be, e.g., a clamping roller which is blocked, i.e, thus does not rotate in the clamping position, and which is rotatable, in particular is freely rotatable in the transport position.

According to a further development of the at least one clamping element, this is movable, in particular pivotable, towards the embossing foil web with a movement component transverse to the foil transport path, for clamping the embossing foil web, i.e. for assuming a clamping position. The clamping element is movable, in particular pivotable, away from the embossing foil web in particular with a movement component transverse to the foil transport path, for releasing the clamping, i.e. for assuming the transport position. The away-movement in particular is a counter movement to the towards-movement. Here too, the movable clamping element can be, e.g., a clamping roller.

The movable or the movably mounted clamping element is driven or moved in particular via a drive, such as an electric motor or pneumatic or hydraulic drive. The drive is controlled via the control device.

A clamping element can also be stationary, i.e. not displaceable and in particular also not movable. Such a clamping element can be formed, e.g., by the braking and guidance wall. However, it is also conceivable for no braking and guidance wall to be provided, since the essential function of the braking and guidance wall, specifically the tensioning of the embossing foil web is assumed by the foil tensioning device according to the invention.

Thus a clamping element can also be formed by a stationary, i.e. non-displaceable and in particular immovable guide element, such as a guide roller or guide rod.

However, it is also conceivable for both clamping elements to be mounted in a movable, i.e. displaceable manner.

In the context of the present aspect of the invention, transverse to the foil transport path in particular means parallel to the surface normals of the embossing foil web.

According to a further development of the invention, the foil deflecting device for deflecting the embossing foil web is arranged in front of the flatbed press considered in the transport direction of the embossing foil web.

The foil deflecting device is arranged in particular between a foil store such as a foil loop store, and the flatbed press. The foil store in particular serves for the temporary intermediate storing of a foil web length of the embossing foil web between two embossing procedures.

The foil deflecting device in particular includes a foil deflecting element which for the purpose of deflecting the embossing foil web is movable, in particular pivotable, with a movement component transverse to the foil transport path. Hence the foil deflecting element can be pivotably mounted via a pivot axis. The foil deflecting element can be, e.g., a part of a lever mechanism. The foil deflecting element can also be movable with a movement component transverse to the foil transport path via a linear movement. The foil deflecting element in particular is driven or moved via a drive, such as an electric motor or pneumatic or hydraulic drive. The drive is controlled via the control device.

For deflecting the embossing foil web, the foil deflecting element is moved towards the embossing foil web with a movement component transverse to the foil transport path. The foil deflecting element herein presses the embossing foil web away in a lateral manner, which is to say transversely to the foil transport path. The laterally pressed-away embossing foil web in particular forms a laterally projecting arching or open foil loop.

On account of the deflecting of the embossing foil web, the foil path or the transport stretch of the embossing foil web lengthens, in particular between the counter-holder elements which are yet described hereinafter.

Since the embossing foil web considered in the transport direction is clamped in front of as well as after the embossing foil deflecting device, the additional path stretch for the lateral deflection can only be provided via a tensioning or stretching of the embossing foil web section which is led through the flatbed press. The tensioning or stretching of the embossing foil web section can be set in a comparatively simple manner via the extent of the deflection of the embossing foil web. Hence for example a stretching of the foil by 4 mm to 10 mm per running meter is conceivable.

According to a further development of the invention, the foil deflecting device includes two counter-holder elements which are distanced to one another along the transport direction of the embossing foil web and which are arranged on the side of the embossing foil web which lies opposite the foil deflecting element. A deflection section of the embossing foil web is formed between the counter-holder elements.

The counter-holder elements ensure that the embossing foil web is only deflected between the counter-holder elements. The foil deflecting element accordingly acts upon the embossing foil web in a deflecting manner between the two counter-holder elements, which is to say is moved towards the embossing foil web between the two counter-holder elements. On deflecting the embossing foil web, this is accordingly deflected into the deflection about the counter-holder elements.

The counter-holder elements can be guide elements, such as guide rods or guide rollers. In particular, the counter-holder elements are arranged in a stationary manner.

If several embossing foil webs are led through the flatbed press next to one another, in particular parallel to one another, considered in the foil transport direction, then in particular a foil deflecting device is assigned to each embossing foil web. This permits the individual setting or control of the foil tension for each embossing foil web.

In a further development of this variant, it is also conceivable for a foil clamping device or first and second foil clamping device to be assigned to each embossing foil web. This permits the individual clamping of the embossing foil webs. However, the embossing foil webs can also be clamped by a common foil clamping device or first and second foil clamping device.

A corresponding method for operating an aforedescribed flat embossed printing machine also belongs to the further aspect of the invention. For this, the embossing foil web and the flat material are positioned in the flatbed press and led together by way of closing the flatbed press. Embossing pictures are transferred from the embossing foil web onto the flat material by way of an embossing procedure.

The further aspect of the invention is now characterised in that the embossing foil web is clamped at the clamping location, or at the first and second clamping location, before the closing of the flatbed press, and the foil deflecting element is subsequently moved, in particular pivoted, towards the embossing foil web and the foil deflecting element deflects the embossing foil web transversely to the foil transport path until the embossing foil web section which is led through the flatbed press has a predefined tension.

The foil tensioning device according to the invention, as mentioned, permits the control or setting of the foil tension and thus a controlled stretching of the foil before each embossing cycle.

Furthermore, the foil tensioning device according to the invention is also characterised in that this permits a comparatively rapid change between the clamping and transport position. In particular, this is of significance given a flat embossed printing machine with a peel-away element according to the first aspect of the invention. Hence the clamping device must be in the clamping position during the embossing cycle for a register-accurate positioning of the embossing foil web and subsequently to the embossing procedure must change into the transport position for pulling back the foil web excess length and the subsequent feed or advance of the embossing foil web. This means that the clamping device constantly changes over several embossing cycles between a clamping position and a transport position. The quicker is this change between the clamping position and transport position, the shorter does an embossing cycle last. A more rapid change between the clamping position and transport position and hence shorter cycle times compared to a braking and guide wall are now achieved with the foil tensioning device according to the invention.

BRIEF DESCRIPTION OF THE DRAWINGS

The subject-matter of the invention is hereinafter explained in more detail by way of an embodiment example which is represented in the accompanying figures. Shown schematically in each case are:

FIG. 2 a cross-sectional view from the region of the peel-away element of the flat embossed printing machine according to FIG. 1;

FIG. 3 a cross-sectional view of a typical embossing foil;

FIG. 4 a speed profile of foil advance and sheet transport;

DETAILED DESCRIPTION OF THE INVENTION

Figure 1:
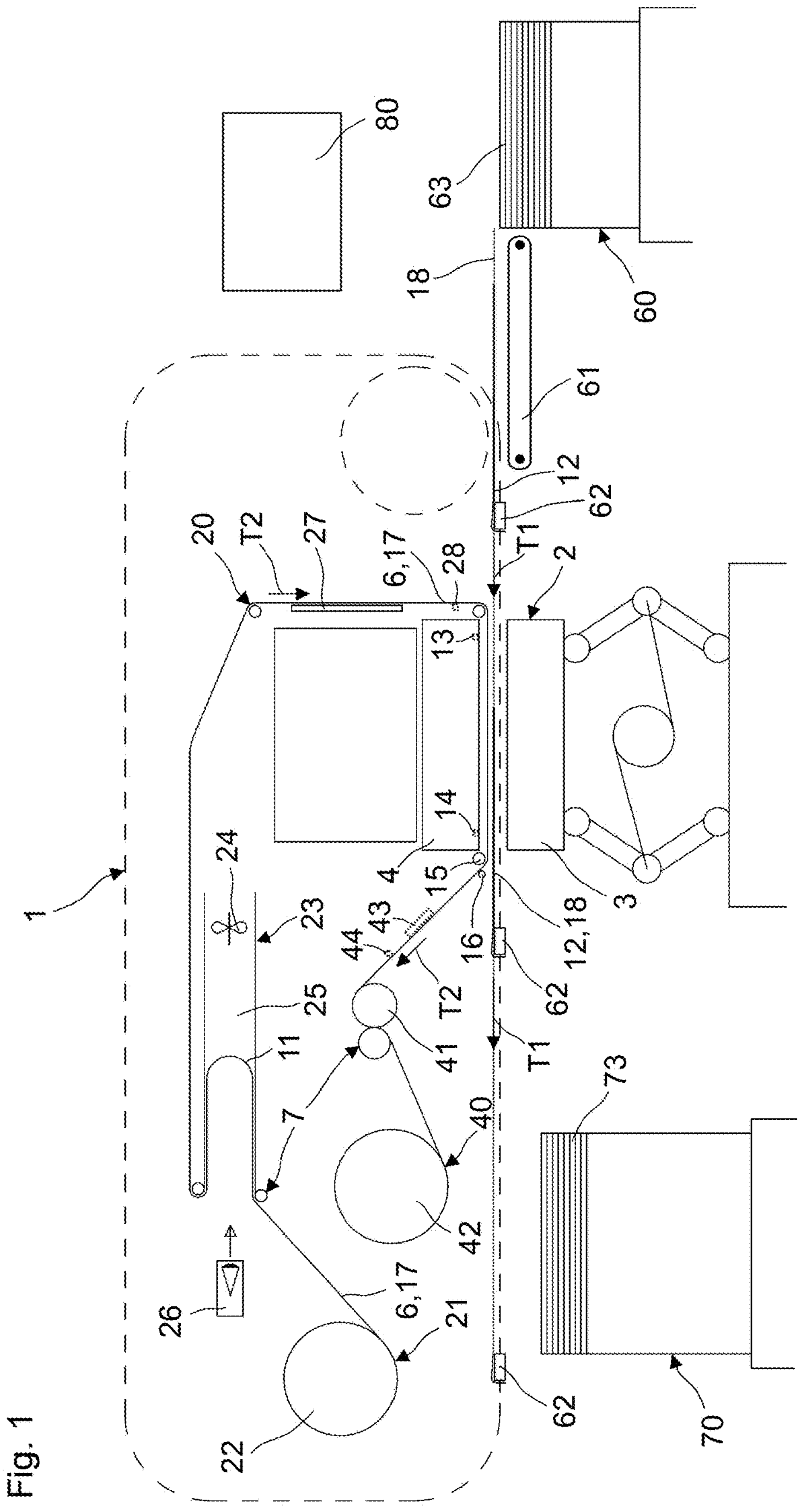
FIG. 1: a cross-sectional view of a flat embossed printing machine according to the invention.

Basically, in the figures the same parts are provided with the same reference numerals. Certain features, for example features which are not essential for the invention are not represented in the figures for a better understanding of the invention. The described embodiment example is exemplary for the subject-matter of the invention or serves for its explanation and has no limiting effect.

FIG. 1 shows an embodiment example of a flat embossed printing machine 1 according to the invention, with a flatbed press 2 which is designed as a flat-flat press, for embossing sheets 12. The flatbed press 2 includes an embossing table 3 with a counter-pressure plate and as a counter-piece a tool plate 4 with heated embossing tools, also called "Clichés", (not shown) which are arranged on this tool plate at the embossing side.

The sheets 12 which are to be embossed are individually pulled away from a sheet stack 63 which is provided in a sheet feeder 60, and are transported to the flat embossing table 3 via a transport device 61. For this, the singularised sheet 12 is gripped and held at its leading edge by a gripper beam 62 and is pulled by this onto the embossing table 3 of the open flatbed press 2 and positioned below an embossing foil web 6.

The embossing foil web 6 is constructed in a multi-layered manner and includes a carrier foil 55, e.g. of polyester, which serves as a carrier for the further layers (see FIG. 3). An embossing picture 57 is arranged on the carrier foil 55 via a separating layer 56. An outer-lying activatable adhesive layer 58 is arranged on the embossing picture 57 at the embossing side of the embossing foil web 6.

The embossing picture 57 with the adhesive layer in front is pressed onto the sheet 12 during the embossing procedure. By way of activating the adhesive layer 58, e.g. by way of heat, the embossing picture 57 connects to the sheet 12 via the adhesive layer 58. On the other hand, the separating layer 56 loses its adhesive force or this is reduced, due the effect of heat, so that the carrier foil 55 can be released from the embossing picture 57 along the separating layer 56 subsequently to the embossing procedure, the embossing picture being applied on the sheet 12.

The embossed sheets 12 subsequently to the embossing procedure are each pulled out of the opened flatbed press 2 by way of the gripper bar 62 and are fed to a sheet delivery 70 amid the formation of a sheet stack 73 of embossed sheets.

The flat embossed printing machine 1 further includes a foil web guidance and transport device 7 for transporting and guiding an embossing foil web 6, also called picture foil web, with embossing pictures 57 arranged thereon, through the flatbed press 2.

The foil web guidance and transport device 7 includes a foil feed device 20 for feeding an embossing foil web 6 to the flatbed press 2. The foil feed device 20 includes an unwinding device 21 for receiving an unwind roll 22, on which the embossing foil web 6 is wound as a roll product and from which embossing foil web 6 is unwound for the foil advance.

The flat embossed printing machine 1 or the foil web guidance and transport device 7 includes a foil loop store 23 downstream after the unwinding device 21 and in front of the flatbed press 2 in the transport direction $T_2$ of the embossing foil web 6. The foil loop store 23 includes at least one loop receiver 25 for receiving a foil loop 11, as well as a vacuum device 24 for shaping the foil loop 11 in the loop receiver 25. For this, a vacuum is exerted by the vacuum device 24 upon the embossing foil web 6 which is led past the loop receiver 25. By way of this, the embossing foil web 6 is sucked into the loop receiver 25 amid the formation of the foil loop 11.

As already eluded further above, the foil advance on the flatbed press 2 is intermittent, wherein this foil advance is matched to the embossing cycle. Hence, for example, the embossing foil web 2 is at rest in the closed flatbed press 2 during the embossing procedure, whereas given an opened press the foil advance is effected at a high speed at the beginning of a new embossing cycle. The foil advance must be effected in a gentle as possible and precise manner, but also in a rapid manner, so that the embossing foil web 6 on the one hand is advanced rapidly but despite this in a gentle manner into the next embossing position, as well as positioned in an exact manner or even in register on the embossing table 3 and is kept still in a positionally accurate manner on closing the flatbed press 2.

On changing between the holding-still and foil advance or between the foil advance and the holding-still, the covered speed profile has high positive or negative accelerations.

Since the unwinding device 21 with the heavy unwind roll 22 reacts in a far too sluggish manner between the standstill and high advance speed for the rapid and above all greatly changing transport speed of the embossing foil web 6 on the flatbed press 2, speed differences between the advance speed at the flatbed press 2 and the web speed or unwinding speed at the unwind roll 22 are equalised or compensated by way of a suitable enlargement or size reduction of the foil loop 11 in the foil loop store 23.

Thus, with regard to the embossing foil web length for the foil advance, in contrast to the unwinding device 21 it is merely the intrinsic weight of the embossing foil web length which is intermediately stored in loop form which needs to be moved out of the loop receiver 25. Moreover, the embossing foil web length which is stored in a loop-like manner is not mechanically held in the foil store. By way of this, the foil loop store 23 can provide embossing foil web lengths with a very low reaction time, for the foil advance which is effected rapidly and at a high speed.

Furthermore, a sensor device 26 for detecting the stored embossing foil web length is assigned to the foil loop store 23. The vacuum device 24 is controlled on the basis of the store data which is determined by the sensor device 26.

A flat braking and guidance wall 27 past which the embossing foil web 6 is led can be arranged between the foil loop store 23 and the flatbed press 2.

The braking and guidance wall 27 serves as a foil tensioning device and forms a guide surface, via which the at least one embossing foil web 6 is led. The guide surface interacts with a vacuum device, by way of which a vacuum can be generated on the guide surface. The applied vacuum ensures that the embossing foil web 6 bears on or is sucked onto the guide surface of the braking and guidance wall 27. The applied vacuum in particular also ensures a braking of the embossing foil web 6. The greater the applied vacuum, the greater is the braking effect upon the embossing foil web 6 and vice versa. The guide surface can be formed by a cloth-like or textile-like, air-permeable rest layer. This ensures a gentle guidance of the sensitive embossing foil web 6 despite physical contact between the embossing foil web 6 and the guide surface.

The foil tension between the braking and guidance wall 27 and the foil advance device 41 can be controlled by way of the braking effect of the vacuum which is applied to the guide surface and acts upon the embossing foil web 6 which is led past. An increase of the vacuum on the guide surface leads to a greater braking effect and thus to an increase of the foil tension.

A controlled foil tension, as is yet explained further below, in particular is important in the region of the flatbed press 2 as well as in the context of detecting print marks, since it is only this which ensures an arching-free and if necessary positionally accurate or in-register positioning of the embossing foil web 6 in the flatbed press 2.

However, the braking and guidance wall 27 is not a necessary feature of this invention.

The foil web guidance and transport device 7 further includes a foil lead-away device 40 for leading away the embossing foil web 6 from the flatbed press 1.

The foil lead-away device 40 includes a foil advance device 41 which is arranged after the flatbed press 2, for carrying out the foil advance at the beginning of a new embossing cycle. The foil advance device 41 can include, e.g., a driven advance roller or a driven advance roller pair, by way of which the advancing of the embossing foil web 6 is effected.

The foil lead-away device 40 furthermore downstream of the foil advance device 41 includes a winding roll 42 for winding up the embossed embossing foil web 6.

The embossing foil web 6 is guided through the flatbed press 2 above the embossing table or above the sheet 12 which is positioned on the embossing table 3, and below the tool plate 4 by way of the foil web guidance and transport device 7.

A deflecting rod 15 which ensures a deflection of the embossing foil web 6 obliquely upwards out of a horizontal transport path 17 is arranged at the exit of the flatbed press 2 in the transport direction $T_2$ of the embossing foil web 6 above the transport path 18 of the sheet 12 and the embossing foil web 6.

The foil lead-away device 40 furthermore includes a peel-away element 16 which in the transport direction $T_1$ of the sheets 12 is arranged after the deflecting rod 15 downstream and likewise above the transport path 18 of the sheet 12. The deflecting rod 15 and the peel-away element 16 are arranged such that the transport path 17 of the embossing foil web 6 runs through between the deflecting rod 15 and the peel-away element 16.

Furthermore, the foil lead-away device 40 between the deflecting rod 15 or the peel-away element 16 and the foil advance device 41 can include a (further) flat braking and guidance wall 43 for ensuring a constant foil tension between the foil advance device 41 and the further braking and guidance wall 43.

The further braking and guidance wall 43 can be constructed in the same manner as the braking and guidance wall 27 between the foil store 23 and the flatbed press 2. The further braking and guidance wall 43 is likewise not a necessary feature of this device.

A print mark sensor 44, also called print mark reader can be arranged between the foil advance device 41 and the braking and guidance wall 43. This detects the position of print marks on the embossing foil web 6 for the purpose of a register-accurate positioning of the embossing foil web 6 in the flatbed press 2. The print mark sensor 44 is arranged in a section of the foil transport path 17 between the braking and guidance wall 43 and the foil advance device 41, in which section a controlled foil tension prevails.

Alternatively, the print mark reader 28 can also be arranged between the braking and guidance wall 27 and the flatbed press 22. Alternatively, the print mark reader 13 can also be arranged in the flatbed press 2 at the entry side. Alternatively, the print mark reader 13 can also be arranged in the flatbed press 2 at the exit side.

Common to all three positions for the print mark sensors 13, 14, 28 is the fact that a braking and guidance wall 27 for the purpose of the control of the foil tension is arranged in front of these between the foil store 23 and the flatbed press 2.

The four print mark sensors 23, 14, 28, 44 which are shown at alternative positions along the transport path 17 of the embossing foil web 6 are likewise not an essential feature of the present invention.

As mentioned, at the beginning of an embossing cycle the embossing foil web 6 in the so-called foil advance is advanced by the foil advance device 41 by a defined advance length in the transport direction $T_2$ of the embossing foil web 6 (advance direction). Concerning this procedure, the embossing foil web length which is embossed in the preceding embossing cycle is transported away or pulled out of the open flatbed press 2 in the advance direction $T_2$ and a not yet embossed embossing foil web length of the foil advance is transported or pulled into the open flatbed press 2. Furthermore, a new sheet 12 is transported from the sheet feeder 60 into the open flatbed press 2 by way of a gripper beam 62.

If the embossing foil web 6 is to be positioned in the flatbed press 2 in register with the sheet 12, then the print mark sensor 13, 14, 28 or 44 reads out so-called print marks on the embossing foil web 6. For this, the transport of the embossing foil web 6 is effected at a reduced advance speed towards the end of the foil advance (see also FIG. 4).

For this, the print mark sensor 13, 14, 28, or 44 is arranged in an embossing foil web section with a controlled foil tension, downstream of a braking and guidance wall 27 and 43 respectively.

As soon as the embossing foil web 6 and the sheet 12 are positioned in the flatbed press 2 (register-accurate), this is closed and the embossing procedure is carried out by way of a forceful leading together of the tool plate 4 and embossing table 3 by way of the action of pressure and heat.

After completion of the embossing procedure, the flatbed press 2 is opened again and the embossed sheet 12 together with the embossed-out embossing foil web length is transported out of the open flatbed press 2.

Herein, the release of the embossing foil web 6 from the sheet 12 is effected at the exit of the flatbed press 2 in the course of the foil advance. For this, the embossed sheet 12 is pulled out of the opened flatbed press 2 by way of the gripper beam 62, as well as the embossing foil web 6 by way of the foil advance. The embossed sheet 12 at the exit of the flatbed press 2 is pulled away out of the flatbed press 2 in an essentially horizontal direction. The embossing foil web 6 is pulled away obliquely to the top, wherein the deflecting rod 15 which is arranged at the exit side and above the embossing foil web 6 ensures the deflection obliquely upwards from an essentially horizontal guidance.

Given comparatively easily releasable embossing foil webs 6, a detachment of the embossing foil web 6 from the sheet 12 is now effected by push separation by way of pulling away the embossing foil web 6 obliquely upwards and the simultaneous horizontal pulling-away of the sheet 12. The embossing foil web 6 is accordingly deflected at the deflection rod 15.

If however the embossing foil web 6 is not easily releasable, then this remains adhering to the sheet 12 and is horizontally pulled along together with this. Accordingly, the peel-away point 10 or the peel-away line displaces downstream. The embossing foil web 6 which is pulled along now abuts on the peel-away element 16 which is arranged further downstream above the sheet 12 and at a distance to this. Consequently, the embossing foil web 6 is pulled through below the peel-away element 16 amid the formation of a peel-away loop 9 until the retaining force which is generated by the foil tension is greater than the peel-away force which is to be mustered for peeling the embossing foil web 6 away from the sheet 12 (see FIG. 2). Accordingly, the peel-away point 10 now lies downstream of the peel-away element 16.

By way of the formation of a peel-away loop 9, the embossing foil web 6 is peeled away from the sheet 12 at an acute peel-away angle α. The acute peel-away angle α or the peel-away element which ensures the formation of the peel-away loop and accordingly of the acute peel-away angle α furthermore prevent a lifting and consequently a deformation of the sheet 2 by the adhering and upwardly pulled-away embossing foil web 6.

However, an embossing foil web excess length 8 is (post-) pulled due to the peel-away point 10 which is arranged downstream of the peel-away element 16. The embossing foil web excess length 8 is a length section of non-embossed embossing foil web 6 which is (post-) pulled through the flatbed press 2 beyond the specified advance length of the foil advance and is pulled out of the flatbed press 2 at the exit side. This embossing foil web excess length 8 is not (post-) pulled by the foil advance device 41 since the foil advance device 41 merely carries out a foil advance with a predefined advance length.

Now, after completion of the peeling-away procedure, i.e. when the peel-away point 10 releases from the sheet 2, this embossing foil web excess length 8 is pulled back through the open flatbed press 2 counter to the advance direction $T_2$. This is effected by the foil loop store 23 whose vacuum device 24 during the peeling-away procedure exerts a permanent tensile tension upon the embossing foil web 6 which is advanced in the direction of the flatbed press 2.

As soon as the embossing foil web 6 has completely detached from the sheet 2, the embossing foil web 6 springs back in a whip-like manner in the direction of the foil loop store 23 on account of the abrupt drop in tension. The embossing foil web excess length 8 is pulled back in the direction of the foil loop store 23. An embossing foil web length which corresponds to the pulled-back embossing foil web excess length 8 is now formed in the foil loop store 23 and is intermediately stored for the next embossing cycle.

If a braking and guidance wall 27 is arranged between the foil loop store 23 and the flatbed press 2, this is temporarily deactivated during the pulling-back of the foil web excess length, in a manner such that the braking effect is done away with. This, e.g., can be effected by way of a brief venting of the braking and guidance wall 27. By way of this, one prevents the pulling-back of the foil web excess length by way of the foil loop store 23 being inhibited or event prevented on account of the braking effect of the braking and guidance wall 27.

A new embossing cycle can now begin again. The embossing foil web excess length which is intermediately stored in the foil loop store 23 is hereinafter yet supplemented by a further embossing foil web length from the unwind roll 22, so that the total length of the foil web length which is intermediately stored in the foil loop store 23 corresponds at least to the advance length.

The individual assemblies such as the unwinding device, foil loop store, flatbed press, foil advance device and sheet transport device or the individual part-processes of the flat embossed printing machine, unwinding of the foil, storage and release of embossing foil web length respectively in and from the foil loop store, sheet feed and the sheet away-transport, foil advance and embossing procedure, etc. are controlled via the machine control 80. For this, the machine control 80 in particular also processes sensor data from the print mark reader 13, 14, 28 or 44 and store sensors 26.

Basically also several embossing foil webs 6 can be led through the flatbed press simultaneously, in particular parallel to one another, in the flat embossed printing machine 1 for embossing sheets 12 in several zones. These embossing foil webs, driven by a foil advance device 41, are each unwound from the unwind rolls 22 and each transported through the flatbed press 2 via a foil loop store 23 which is arranged in front of the flatbed press 2, and are wound onto a winding roll in the foil lead-away device 40.

FIG. 4 shows a schematic course of the speed profile 50 of the sheet transport and of the speed profile 51 of the foil advance relative to one another. The speed profiles serve merely for illustration and do not represent an effective speed course.

After opening the flatbed press 22 (reference numeral: 52), firstly the sheet transport is started with the speed profile 50. The sheet 12 is hereby pulled out of the flatbed press 2 by way of gripper beams 62. The foil advance starts with the speed profile 51 with some delay. Due to the delayed start of the foil advance, the sheet 12 together with the embossing foil web 6 which adheres to this is pulled towards the peel-away element 16 and amid the formation of a peel-away loop 9 is pulled through below the peel-away element over a certain stretch section.

During a phase of equal speed between the foil advance and the sheet transport, the embossing foil web 6 is peeled away from the sheet 12 amid the formation of a constant peel-away loop 9. Given the complete release of the embossing foil web 6 from the sheet 12 (reference numeral 53), the speed of the foil advance is also lowered to a so-called search speed. In a subsequent search run with a reduced speed of the foil advance, the print mark sensor searches for print marks on the embossing foil web 6 for a register-accurate positioning of the embossing foil web 6 over the flatbed press 2 in preparation for a subsequent embossing cycle.

If no register-accurate positioning of the embossing foil web 6 is necessary, then one can make do without the search run. The speed of the foil advance is then reduced directly to zero at the end of the foil advance.

The speed of the sheet transport is not reduced until some delay with respect to the speed profile 51 of the foil advance towards the end of the sheet transport and lowered to zero. This is because the speed profile of the sheet transport is based on the so-called sheet rapport between two gripper beams 62. The path stretch of a sheet rapport is herein significantly larger than the sheet length in the sheet transport direction $T_1$.

After the foil advance and sheet transport are completed, the flatbed press 2 is closed again for a new embossing cycle (reference numeral 54).

One can envisage the speed profile 51 of the foil advance temporarily having a speed increase (not shown) shortly before the end of the peeling-way procedure for the purpose of reducing the peel-away loop (not shown), before the speed goes back to zero or goes back to the level of the search speed towards the end of the foil advance.

Figure 5:
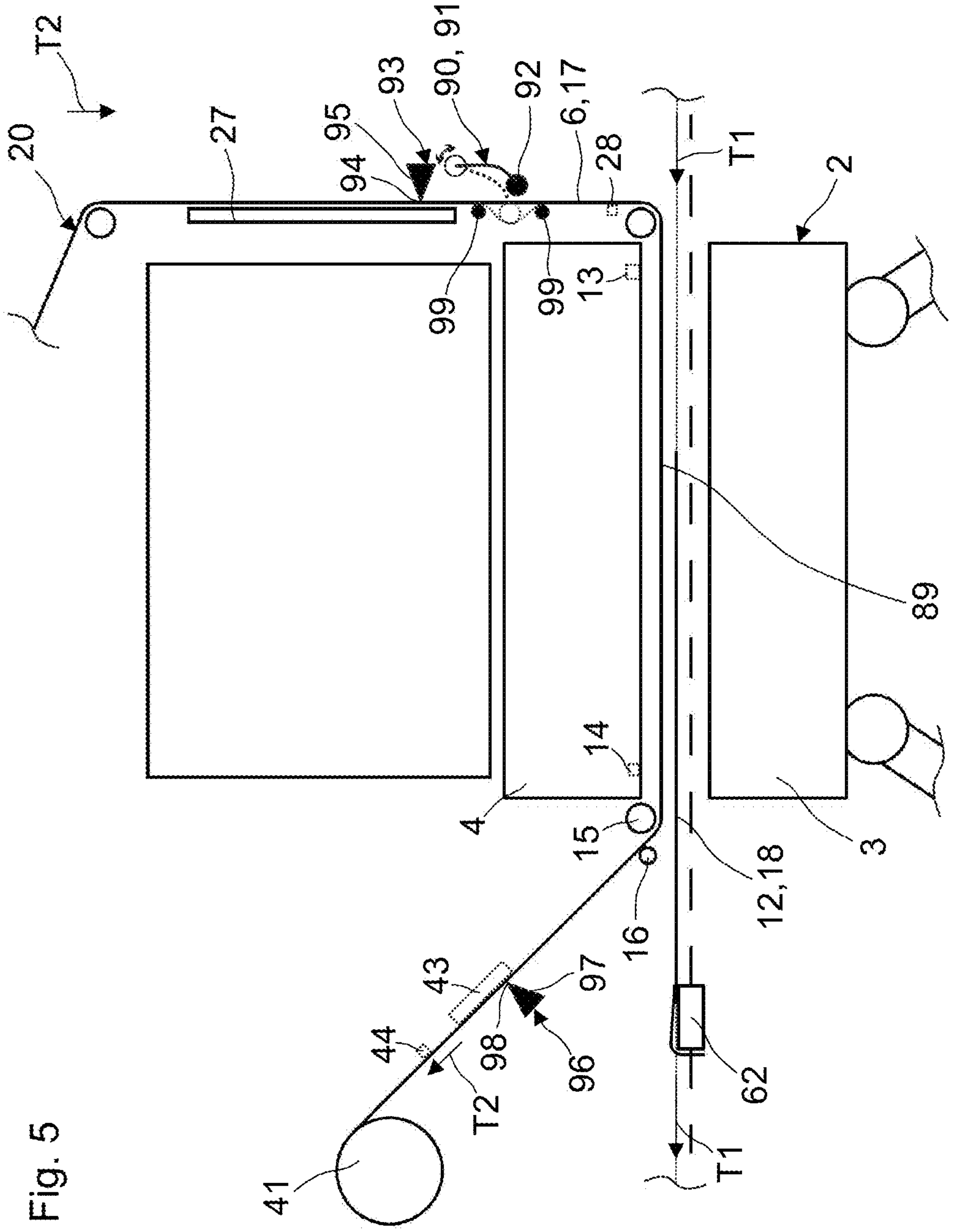
FIG. 5 a cross-sectional view of a further embodiment of a flat embossed printing machine, from the region of the flatbed press.

Concerning the detail from the region of the flatbed press 2 which is shown in FIG. 5, it is the case of part of a flat embossed printing machine 1. For example, it can be a flat embossed printing machine 1 as is shown in FIG. 1, wherein this is additionally equipped with a foil tensioning device 90 according to the second aspect of the invention. However, the foil tensioning device 90 is not restricted to a flat embossed printing machine with a peel-away element according to the first aspect of the invention, but is also suitable for other embodiments of flat embossed printing machines.

The flat embossed printing machine according to FIG. 5 includes a foil tensioning device 90 for tensioning the embossing foil web section 89 which is led through the flatbed press 2.

For this, the foil tensioning device 90 includes a first foil clamping device 93 for clamping the embossing foil web at a first clamping location 94 which in the transport direction $T_2$ of the embossing foil web is arranged in front of the flatbed press 2. For this, the first foil clamping device 93 includes a first and a second clamping element 95, 27, between which the embossing foil web 6 can be led and clamped. For this, the first clamping element 95, e.g. a clamping roller, is movable, in particular pivotable towards the second clamping element 27 amid the creation of a clamping. In the present embodiment example, the second clamping element 43 is formed by braking and guidance wall 27.

Furthermore, the foil tensioning device 90 includes a second foil clamping device 96 for clamping the embossing foil web 6 at a second clamping location 98 which in the transport direction $T_2$ of the embossing foil web 6 is arranged after the flatbed press 2. For this, the second foil clamping device 96 includes a first and a second clamping element 97, 43, between which the embossing foil web 6 is led and can be clamped. For this, the first clamping element 97, e.g. a clamping roller, is movable, in particular pivotable, towards the second clamping element 43 amid the creation of a clamping. The second clamping element 43 is formed by a foil brake 43 in the present embodiment example.

Furthermore, the foil tensioning device 90 includes a foil deflecting device 91 for deflecting the embossing foil web 6 out of the foil transport path 17 between the first and second clamping location 94, 98 for the purpose of the control of the foil tension and for a controlled stretching of the foil. The foil deflecting device 91 is arranged in front of the flatbed press 2 considered in the transport direction $T_2$ of the embossing foil web 6.

The foil deflecting device 91 includes a foil deflecting element 92 which is pivotable towards the embossing foil web 6 transversely to the foil transport path 17. For this, the foil deflection element 92 is pivotably mounted via a pivot axis.

Furthermore, the foil deflecting device 90 includes two counter-holder elements 99 in the form of counter-holder rollers, which are arranged distanced to one another along the transport direction $T_2$ of the embossing foil web 6. These are arranged on the side of the embossing foil web 6 which lies opposite the foil deflecting element 92. A deflection section 6 of the embossing foil web 6 is formed between the counter-holder rollers 99.

The counter-holder rollers 99 ensure that the embossing foil web 6 is only deflected between the counter-holder rollers 99. The foil deflecting element 92 is hereby pivotable towards the embossing foil web 6 between the two counter-holder rollers 99.

For deflecting the embossing foil web 6, the foil deflecting element 92 is pivoted towards the embossing foil web 6 transversely to the foil transport path 17. The foil defecting element 92 herein presses the embossing foil web 6 laterally away out of the foil transport path 17 and deflects this laterally. Herein, the embossing foil web 6 is deflected, which is to say deflected out of the foil transport path 17, at the counter-holder rollers 99. The laterally deflected embossing foil web 6 herein forms a laterally projecting foil loop.

The path stretch of the embossing foil web is lengthened due to the deflecting of the embossing foil web 6. Since the embossing foil web 6 is clamped in front of as well as after the foil deflecting device 91 considered in the transport direction $T_2$, the additional path stretch for the lateral deflection of the embossing foil web 6 can only be provided via a tensioning or stretching of the embossing foil web section 89 which is led through the flatbed press. The tension and with this the stretching of the embossing foil web section 89 is now controlled via the extent of the deflection of the embossing foil web 6.

The invention claimed is:

1. A flat embossed printing machine for embossing a flat material, comprising:

a flatbed press, comprising a tool plate and an embossing table, a foil web guidance and transport device for guiding at least one embossing foil web over the embossing table of the flatbed press along a foil transport path, a flat material guidance for guiding a flat material through the flatbed press along a flat material transport path, and a control device for operating the flat embossed printing machine, wherein:

the foil web guidance and transport device subsequently to the flatbed press as viewed in the transport direction of the flat material comprises a peel-away element which is arranged above the flat material transport path as well as downstream behind the foil transport path, for holding back and peeling the embossing foil web away from the flat material on transporting the flat material away out of the flatbed press, wherein the peel-away element is arranged relative to the flat material transport path such that the embossing foil web which adheres to the embossed flat material which is transported away out of the flatbed press is held back by the peel-away element and thus peeled away amid the formation of an open peel-away loop coming from the peel-away element and which extends downstream in the transport direction of the flat material.

2. The flat embossed printing machine according to claim 1, wherein the foil web guidance and transport device comprises a deflecting element which as viewed in the transport direction of the flat material is arranged at the exit of the flatbed press above the flat material transport path and in front of the peel-away element, for deflecting the embossing foil web out of the transport direction of the flat material wherein the embossing foil web is led into a deflection between the deflecting element and the peel-away element.

3. The flat embossed printing machine according to claim 2, wherein the deflecting element is arranged at a distance to the flat material transport path.

4. The flat embossed printing machine according to claim 1, wherein the peel-away element is arranged at a distance to the flat material transport path.

5. The flat embossed printing machine according to claim 1, wherein the peel-away element is arranged at a distance of 1 mm or larger to the flat material transport path.

6. The flat embossed printing machine according to claim 1, wherein the peel-away element is arranged at a distance of 30 mm or less to the flat material transport path.

7. The flat embossed printing machine according to claim 1, wherein the peel-away element forms an arcuate deflecting surface for the deflection of the embossing foil web.

8. The flat embossed printing machine according to claim 1, wherein the flat embossed printing machine comprises an unwinding device for unwinding the embossing foil web from an unwind roll.

9. The flat embossed printing machine according to claim 8, wherein the flat embossed printing machine comprises a foil store which in the transport direction of the embossing foil web is arranged in front of the flatbed press for the temporary intermediate storing of a foil web length of the embossing foil web between two embossing procedures.

10. The flat embossed printing machine according to claim 9, wherein the foil store comprises a store formation device for filling the foil store with an embossing foil web length.

11. A method for operating the flat embossed printing machine according to claim 1, wherein the embossing foil web and the flat material are positioned and brought together in the flatbed press and embossing pictures are transferred from the embossing foil web onto the flat material by way of an embossing procedure, wherein:

subsequently to the embossing procedure, the flat material is transported away out of the opened flatbed press along the flat material transport path in the transport direction and past the peel-away element, wherein the embossing foil web which is carried along and adheres to the flat material meets the peel-away element and activates a peeling of the embossing foil web away from the flat material, and wherein the embossing foil web is peeled away from the flat material amid the formation of an open peel-away loop coming from the peel-away element and which extends downstream in the transport direction of the flat material.

12. The method according to claim 11, wherein an embossing foil web excess length which is advanced through the flatbed press amid the formation of an open peel-away loop is pulled back again counter to the foil advance direction subsequently to the peeling-away procedure and is intermediately stored in a foil store for a later embossing procedure.

13. The method according to claim 12, wherein the embossing foil web excess length is pulled back by way of the store formation device of the foil store.

14. The flat embossed printing machine according to claim 1, further comprising:

a foil tensioning device for tensioning an embossing foil web section which is led through the flatbed press, and where in the foil tensioning device comprises:

a foil clamping device for clamping the at least one embossing foil web at a clamping location which considered in the transport direction of the at least one embossing foil web is arranged in front of the flatbed press, and a foil deflecting device for deflecting the at least one embossing foil web out of the foil transport path after the clamping location considered in the transport direction of the embossing foil web, for the purpose of controlling the foil tension.

15. The flat embossed printing machine according to claim 14, wherein the foil deflecting device is designed for deflecting the at least one embossing foil web out of the foil transport path between the clamping location and the flatbed press.

16. The flat embossed printing machine according to claim 14, wherein the foil clamping device is a first foil clamping device and the clamping location a first clamping location, and the foil tensioning device comprises a second foil clamping device for clamping the at least one embossing foil web at a second clamping location which in the transport direction of the at least one embossing foil web is arranged after the flatbed press, and the foil deflecting device is designed for deflecting the at least one embossing foil web out of the foil transport path between the first and the second clamping location.

17. The flat embossed printing machine according to claim 14, wherein the foil deflecting device is arranged in front of the flatbed press considered in the transport direction of the at least one embossing foil web.

18. The flat embossed printing machine according to claim 14, wherein the foil deflecting device comprises a foil deflecting element which amid the deflection of the at least one embossing foil web is movable with a movement component transverse to the foil transport path.

19. The flat embossed printing machine according to claim 14, wherein the foil deflecting device comprises two counter-holder elements which are distanced to one another in the transport direction of the embossing foil web and which are arranged on the side of the embossing foil web which lies opposite the foil deflecting element and between which a deflection section for the embossing foil web is formed.

20. The flat embossed printing machine according to claim 14, wherein the flat embossed printing machine forms several foil transport paths for leading several embossing foil webs next to one another through the flatbed press, wherein a foil deflecting device for the individual setting of the foil tension for each embossing foil web is assigned to each foil transport path.

21. A method for operating a flat embossed printing machine according to claim 14, wherein the at least one embossing foil web and the flat material are positioned in the flatbed press and brought together by way of closing the flatbed press and embossing pictures are transferred from the at least one embossing foil web onto the flat material by way of an embossing procedure, wherein the at least one embossing foil web is clamped at the clamping location before the closing of the flatbed press, and the foil deflecting element is subsequently moved, in particular pivoted, towards the embossing foil web, and the foil deflecting element deflects the at least one embossing foil web transversely to the foil transport path until the embossing foil web section which is led through the flatbed press has a predefined tension.

* * * * *